(12) United States Patent
Iguchi et al.

(10) Patent No.: US 9,773,038 B2
(45) Date of Patent: Sep. 26, 2017

(54) APPARATUS AND METHOD FOR STARTING UP SOFTWARE

(71) Applicant: FUJITSU LIMITED, Kawasaki-shi, Kanagawa (JP)

(72) Inventors: Haruyo Iguchi, Yokohama (JP); Shigeru Hidesawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 328 days.

(21) Appl. No.: 13/941,963

(22) Filed: Jul. 15, 2013

(65) Prior Publication Data
US 2014/0040298 A1    Feb. 6, 2014

(30) Foreign Application Priority Data
Aug. 1, 2012    (JP) .................................. 2012-171165

(51) Int. Cl.
| G06F 17/30 | (2006.01) |
| G06Q 30/02 | (2012.01) |
| G06F 9/445 | (2006.01) |

(52) U.S. Cl.
CPC ........ *G06F 17/30386* (2013.01); *G06F 9/445* (2013.01); *G06Q 30/0269* (2013.01)

(58) Field of Classification Search
CPC .............................................. G06F 17/30386
USPC .............. 707/706, 713, 722, 736, 758, 781, 707/999.005–999.006; 715/745; 725/39
See application file for complete search history.

(56) References Cited

U.S. PATENT DOCUMENTS

| 8,392,282 | B2 | 3/2013 | Nagasaka et al. |
| 2004/0236680 | A1* | 11/2004 | Luoffo et al. .................. 705/39 |
| 2005/0165712 | A1* | 7/2005 | Araki et al. ...................... 707/1 |
| 2011/0154216 | A1* | 6/2011 | Aritsuka et al. .............. 715/745 |

FOREIGN PATENT DOCUMENTS

| JP | 11-134360 A | 5/1999 |
| JP | 2000-099076 A | 4/2000 |
| JP | 2003-271389 A | 9/2003 |
| JP | 2010-157207 A | 7/2010 |

* cited by examiner

*Primary Examiner* — Syling Yen
(74) *Attorney, Agent, or Firm* — Maschoff Brennan

(57) ABSTRACT

An apparatus is provided with first information on software and character strings for determining a keyword related to second information on software that a user wants to use. The apparatus generates, in accordance with a level of the user who uses software obtained from a first external device coupled to a communication network, based on the first information and third information that is related to software and obtained from a second external device connected to the communication network, fourth information indicating software recommendable to the user. The apparatus receives the second information from the user, and determines a keyword related to the fourth information by comparing the fourth information with the character strings provided for the apparatus. The apparatus obtains software to be recommended to the user by comparing the fourth information with the determined keyword, and starts up the obtained software.

8 Claims, 11 Drawing Sheets

FIG. 3A

| AUDIO ID | DISPLAY NAME | PRONUNCIATION | KEYWORD |
|---|---|---|---|
| 10001 | FUDEMAME (REGISTERED TRADEMARK) | FUDEMAME | POSTCARD CREATION |
| 10002 | OUTLOOK (REGISTERED TRADEMARK) | AUTORUKKU | MAILER |
| ... | | | |
| 20001 | NEW YEAR'S CARD | NENGAJO | POSTCARD CREATION |
| 20002 | POSTCARD | HAGAKI | POSTCARD CREATION |
| 20003 | MAIL | MERU | MAILER |
| ... | | | |

FIG. 3B

| USER ID | USER LEVEL | SETTING DATE (FINAL UPDATE DATE) |
|---|---|---|
| 1234567890 | 1 | 1/10/2012 |

FIG. 3C

| KEYWORD | USER LEVEL | SETTING DATE (FINAL UPDATE DATE) |
|---|---|---|
| POSTCARD CREATION | 1 | 01/10/2012 |
| MAILER | 2 | 01/10/2012 |
| ADDRESS BOOK | 2 | 03/20/2012 |

FIG. 3D

| SOFTWARE ID | DISPLAY NAME | VERSION | KEYWORD | TARGET LEVEL | EVALUATION | NUMBER OF TIMES OF DOWNLOADING | STATE | STORAGE DESTINATION (LINK) | NUMBER OF TIMES OF USE | USED TIME (TOTAL) | FINAL USAGE DATE |
|---|---|---|---|---|---|---|---|---|---|---|---|
| 10001 | SOFTWARE A | 1.0.0 | POSTCARD CREATION | 1, 2, 3 | — | — | INSTALLED | C:\*\*\***.exe | 5 | 3.5 | 4/4/2012 |
| 10002 | SOFTWARE B | 1.0.0 | POSTCARD CREATION | 2, 3 | 3 | 10,000 | BUNDLED | C:\***\install.exe | 0 | 0 | — |
| 10003 | SOFTWARE C | 1.0.0 | MAILER | 1, 2, 3 | 5 | 100 | DOWNLOADED | D:\*\* | 0 | 0 | — |
| 10004 | SOFTWARE D | 1.0.0 | MAILER | 1, 2 | 2 | 100 | UNDOWNLOADED | http://*/*/***.html | 0 | 0 | — |
| ... | ... | ... | ... | ... | ... | ... | ... | ... | ... | ... | ... |

FIG. 3E

| KEYWORD | POSTCARD CREATION | BROWSER | MAILER |
|---|---|---|---|
| PRIORITY 1 | FUDEMAME | SOFTWARE E | OUTLOOK |
| PRIORITY 2 | SOFTWARE A | SOFTWARE F | SOFTWARE C |
| PRIORITY 3 | SOFTWARE H | SOFTWARE I | SOFTWARE J |
| ... | ... | ... | ... |

FIG. 11A

RECOMMEND YOU FOLLOWING SOFTWARE.
SELECT SOFTWARE YOU WANT TO USE AND CLICK "EXECUTE".
DISPLAY OPERATION GUIDE IF YOU SELECT UNINSTALLED SOFTWARE.

KEYWORD:[MAILER]
◉ OUTLOOK (INSTALLED)
○ SOFTWARE A (DOWNLOADED)
○ SOFTWARE B (UNDOWNLOADED)

※ PLURALITY OF KEYWORDS ARE RECOGNIZED

[SWITCH KEYWORD]

[EXECUTE]   [CANCEL]

FIG. 11B

[MAILER] WILL BE STATED UP. OK?

[OK]   [CANCEL]   [NEXT CANDIDATE]

FIG. 11C

PLURALITY OF KEYWORDS ARE RECOGNIZED.
SELECT KEYWORD TO BE EXECUTED.

[MAILER]
[POSTCARD CREATION]

[CANCEL]

APPARATUS AND METHOD FOR STARTING UP SOFTWARE

CROSS-REFERENCE TO RELATED APPLICATION

This application is based upon and claims the benefit of priority from the prior Japanese Patent Application No. 2012-171165, filed on Aug. 1, 2012, the entire contents of which are incorporated herein by reference.

FIELD

The embodiments discussed herein are related to apparatus and method for starting up software.

BACKGROUND

In the related art, various pieces of software (including applications) are installed in an information processing apparatus such as a personal computer (PC) that is used by the user. The user selects software that corresponds to the purpose of use, from the installed pieces of software and performs input, obtaining, and the like, of information by starting up the selected software.

There are a lot of pieces of software that have a similar function, and there may be a case where the user does not know software that corresponds to the purpose of use or a case where the user forgets the existence of the software. Given this situation, it is difficult to select appropriate software that corresponds to the purpose of use. Therefore, in the related art, there are various methods of selecting software.

For example, in the related art, there is a method of analyzing a character string of a sentence that indicates a request input by the user and selecting software that corresponds to the request. In addition, in the related art, there is a method of identifying the user by audio recognition, identifying an input word, determining software to be started up, and setting a software environment that is specific to the user. In addition, in the related art, there is a method of narrowing down optimal software by storing a description that indicates a function of each piece of software and an icon that corresponds to the software, and performing fuzzy search of the stored contents on the basis of the input of the user. In addition, in the related art, there is a method of displaying a list of recommendation software that corresponds to software that is to be first executed in an information processing apparatus of the user, and selecting software that is optimal for equipment and the user by using an equipment profile and a user profile (for example, Japanese Laid-open Patent Publication NoS. 2003-271389, 2000-99076, 11-134360, and 2010-157207).

SUMMARY

According to an aspect of the invention, an apparatus is provided with first information on software and character strings for determining a keyword related to second information on software that a user wants to use. The apparatus generates, in accordance with a level of the user who uses software obtained from a first external device coupled to a communication network, based on the first information and third information that is related to software and obtained from a second external device connected to the communication network, fourth information indicating software recommendable to the user. The apparatus receives the second information from the user, and determines a keyword related to the fourth information by comparing the fourth information with the character strings provided for the apparatus. The apparatus obtains software to be recommended to the user by comparing the fourth information with the determined keyword, and starts up the obtained software.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A to 3E are diagrams illustrating examples of various databases, according to an embodiment;

FIGS. 11A to 11C are diagrams illustrating examples of screen, according to an embodiment.

DESCRIPTION OF EMBODIMENTS

However, in the above-described methods of the related art, the selected software is started up regardless of the level of the user. Thus, in the related art, for example, even software in a field (category), which the user usually does not use, such as table calculation software and drawing software is selected undesirably without distinction, and the selected software may be clumsy to use for the user. In addition, it is desirable that software having a substantial function is started up even when the software includes a complicated operation as long as the software is in a field of software that the user has used to some extent. However, in the related art, as described above, software that takes into account the level of the user is not selected, so that it is difficult to remind the user of the existence of preferable software that corresponds to the demand and the level of the user and cause the user to start up the preferable software, even when the preferable software exists.

The embodiments are described in detail below with reference to the accompanying drawings.

<Example of a Function Configuration of an Information Processing Apparatus>

Figure 1:
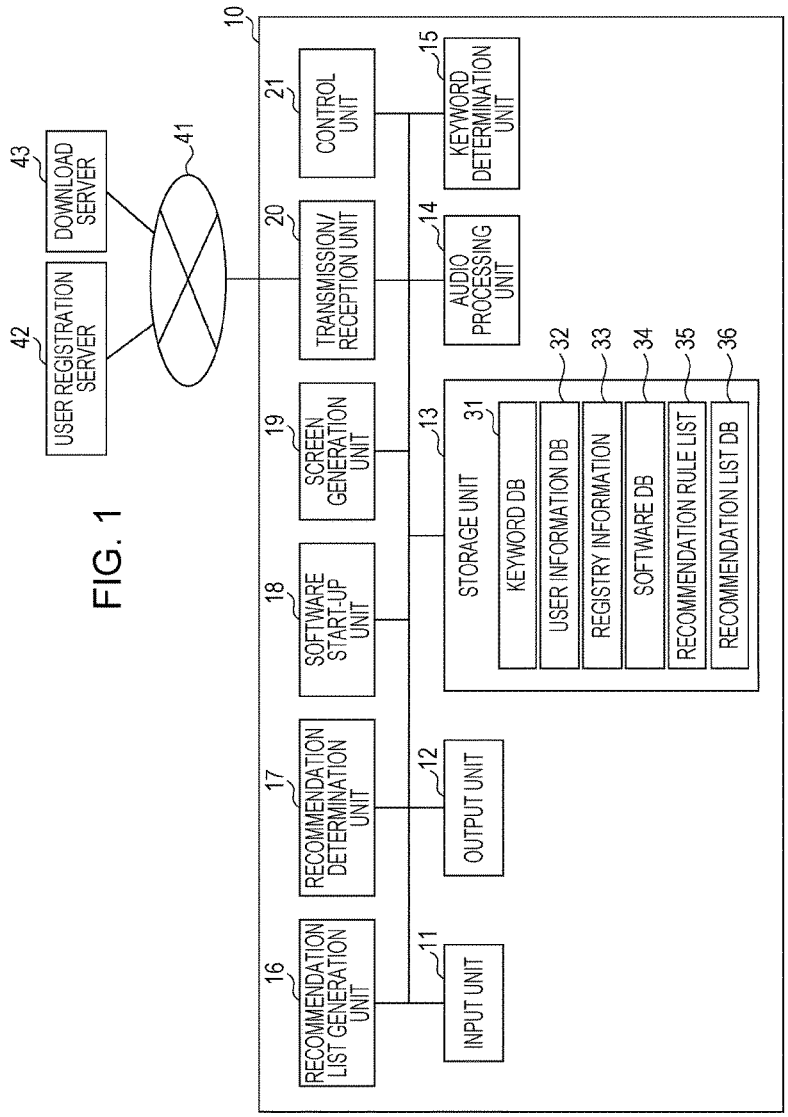
FIG. 1 is a diagram illustrating an example of a functional configuration of an information processing apparatus, according to an embodiment.

FIG. 1 is a diagram illustrating an example of a function configuration of an information processing apparatus, according to an embodiment. An information processing apparatus 10 illustrated in FIG. 1 includes an input unit 11, an output unit 12, a storage unit 13, an audio processing unit 14, a keyword determination unit 15, a recommendation list generation unit (recommendation information generation unit) 16, a recommendation determination unit 17, a software start-up unit 18, a screen generation unit 19, a transmission/reception unit 20, and a control unit 21.

The input unit 11 accepts various inputs such as start/end of various instructions and a setting input from the user who uses the information processing apparatus 10. For example, the input unit 11 accepts an input of an execution instruction of software start-up processing according to the embodiment and accepts an input of information on software that the user wants to use (demands). The input of information that is obtained by the input unit 11 may be, for example, an input through an input interface such as a keyboard and a mouse, may be an input through a touch-panel using a screen, and may be an input using an operation key, or the like. In addition, the input unit 11 may include, for example, an audio input unit that accepts an input of audio through a microphone, or the like.

The output unit 12 performs output of contents that are input by the input unit 11, contents that are processed on the basis of the input contents, and the like. The output unit 12 may include, for example, a display unit (graphic interface) such as a display or a monitor when the output is performed by a screen display, and may include, for example, an audio output means such as a speaker when the output is performed by audio. In addition, the input unit 11 and the output unit 12 may be implemented using, for example, a touch-panel in which the input and the output are integrated into each other.

The storage unit 13 stores various pieces of information that are desired in the embodiment. For example, the storage unit 13 includes a keyword database (hereinafter, "database" may be referred to as "DB") 31, a user information DB 32, registry information 33, a software DB 34, a recommendation rule list 35, and a recommendation list DB 36, however the contents are not limited to such examples.

The keyword DB 31 stores a certain keyword for each piece of software that is started up or presented to the user as recommendation software on the basis of audio information and character information that include a natural language input by the user. For example, the keyword DB 31 stores a word (registration word) that is used to recognize the purpose of use of the user or a software name from the audio information and the character information, and stores a keyword that indicates a field (category) of software related to the word.

In addition, the user information DB 32 stores information that is used to identify the user (for example, a user ID, a password, and the like) and personal information such as an age, a sex, an address, and a mail address of the user. In addition, the user information DB 32 may store a usage level (technology level) of the user for each field or function of software (for example, text editing, table calculation, drawing, and mail). In addition, the user information DB 32 may store information on software that the user wants to use (demands), and the like. The user information DB 32 may obtain the information, for example, from a user registration server 42 that is coupled to the transmission/reception unit 20 so as to transmit or receive data to or from the transmission/reception unit 20 through a communication network 41 such as the Internet. However, the embodiment is not limited to such an example, and the information may be set beforehand.

In addition, the registry information 33 includes basic information of an operating system in the information processing apparatus 10, extended information of software, and the like. In addition, as the registry information 33, setting of an operating system and an application, association information of an extension, and the like, are stored in a storage area of a hard disk. In addition, the registry information 33 includes information on software that has been already installed in the information processing apparatus 10. Thus, in the embodiment, the information on software that has been installed in the information processing apparatus 10 may be obtained from the registry information 33.

The software DB 34 stores information on installed or pre-installed software, and the like. In addition, the software DB 34 stores information on software that is in a bundle state or a downloaded state. That is, the software DB 34 stores information on software that is allowed to be started up and information on software that may be recommended to the user. In addition, the software DB 34 stores information on installed or pre-installed software that is obtained from the registry information 33.

In the recommendation rule list 35, one or more rules indicating standard that is used to select recommendation software from a plurality of pieces of software are set beforehand. The recommendation list DB 36 stores a software recommendation list that is generated by the recommendation list generation unit 16, or the like. Examples of the pieces of information mentioned above will be described later. In addition, information that is stored in the storage unit 13 is not limited to these pieces of information, and the storage unit 13 may be configured to store setting information that is needed for the information processing in the embodiment and information on the execution result of the processing as well.

In addition, the storage unit 13 may read and write the various pieces of stored information at certain timing as appropriate. In addition, the storage unit 13 may include a function as a database that is aggregation of various pieces of information as described above and that is systematically configured to search for the information using, for example, a keyword, or the like, and extracts the information. The storage unit 13 may be implemented, for example, using a hard disk or a memory.

The audio processing unit 14 executes digital signal processing on audio information that is input from the microphone, or the like, of the input unit 11 and obtains characters, a word, a sentence, or the like, which is included in the audio information. The timing at which the audio is recognized is, for example, timing at which a certain trigger is recognized. For example, the above-described audio processing may be started by obtaining audio information from the microphone or by reading the movement of the mouth of the user, which is captured by a camera (imaging unit). The input audio information is, for example, information that is related to software that the user wants to user (demands). Information such as character information on which the digital signal processing is executed is stored in the storage unit 13.

The keyword determination unit 15 analyzes character information that is obtained by the audio processing unit 14 or character information that is input by the keyboard of the input unit 11, and compares a word (character string) that is included in the character information with a registration word (character string) that is stored in the keyword DB 31. For example, the keyword determination unit 15 determines whether or not the word included in the character information matches the registration word by comparing the word included in the character information with the registration word. In addition, the keyword determination unit 15 outputs a keyword that is stored in association with the registration word, to the recommendation determination unit 17 when it is determined that the word included in the character information matches the registration word. The matching is not limited to full matching, and may include a similarity of a certain degree or more (for example, similarity of 80% or more between the word and the registration word).

The recommendation list generation unit 16 generates recommendation information (for example, recommendation list) that corresponds to a condition of the recommendation rule list 35, based on the software information that is obtained from the software DB 34 and the registry information 33, and the user level that is stored in the user information DB 32. In the software information that is obtained from the software DB 34 or the registry information 33, for example, information on software that is in the bundle state or in the undownloaded state are included in addition to information on installed or pre-installed software. Thus, the recommendation list generation unit 16 may generate, for example, a recommendation list from information on each piece of installed, pre-installed, bundled, and undownloaded software, in accordance with a level of the user who uses software, which is obtained from the user registration server 42. In addition, the recommendation list generation unit 16 may generate a recommendation list that includes priority of software. The generated recommendation list is stored in the recommendation list DB 36.

The recommendation determination unit 17 selects one or more pieces of software having high recommendation priority by verifying the keyword obtained as the determination result of the keyword determination unit 15 with the recommendation list DB 36, and outputs the selected software to the software start-up unit 18.

The software start-up unit 18 starts up the software obtained by the recommendation determination unit 17, by a certain start-up scheme, and executes processing of guiding the user to a certain operation. Examples of the above-described certain start-up scheme include a "direct start-up" scheme to directly start up software without an instruction from the user and a "selection start-up" scheme to start up software after a selection instruction is received from the user. However, the embodiment is not limited to these examples. In addition, the processing of guiding the user to an certain operation includes, for example, processing of causing the PC of the user to access a download server 43 from which software corresponding to the purpose of use of the user may be downloaded when the software exists but is not installed into the PC of the user yet. The processing of guiding the user to a certain operation is not limited these examples.

The screen generation unit 19 generates contents to be displayed on a screen of the output unit 12. For example, the screen generation unit 19 may generate a screen used to input audio or character information, a keyword determination screen, a recommendation list display screen, a software start-up screen, and the other various setting screens. However, the embodiment is not limited to these examples. The screen generation unit 19 causes the output unit 12 to output each of the generated screens.

The transmission/reception unit 20 is, for example, a communication unit that is used to transmit and receive data to and from an external device through the communication network 41 such as the Internet or a local area network (LAN). In the example of FIG. 1, as the external devices, there are the user registration server 42 (first external device) and the download server 43 (second external device). However, the embodiment is not limited to these examples.

The user registration server 42 manages, for example, a user who has purchased the information processing apparatus 10. In addition, the user registration server 42 is managed, for example, by a manufacturer of the information processing apparatus 10, a provider of the software start-up program in the embodiment, and the like. In the initial start-up of the information processing apparatus 10 or in the initial setting after installation of a program, the user accesses the user registration server 42 through the communication network 41 to perform registration of the user information. In the embodiment, under control of the control unit 21 in the information processing apparatus 10, information on the user who uses the information processing apparatus 10 is obtained from the user registration server 42, and the obtained information is stored in the user information DB 32 of the storage unit 13. In addition, in the embodiment, information input in the user registration server 42 at the time of user registration may be stored in the user information DB 32 directly.

In addition, in the download server 43, one or more pieces of software that are allowed to be downloaded are stored. The download server 43 may manage plural pieces of software by rearranging the plural pieces of software in order of released times or by ranking the plural pieces of software depending on the number of times of downloading by a plurality of users. In the embodiment, under control of the control unit 21 in the information processing apparatus 10, predetermined software information is downloaded from the download server 43 through the communication network 41. The predetermined software information includes, for example, the first to 10th of pieces of software information in the download ranking for each field and information on new software although the embodiment is not limited to these examples.

Information on the downloaded software is stored in the software DB 34. In addition, since the download server 43 actually manages the real pieces of software, when a download request for the predetermined software is issued from the information processing apparatus 10, the download server 43 extracts the corresponding software, and transmits the corresponding software to the information processing apparatus 10 through the communication network 41.

Here, the transmission/reception unit 20 may receive various pieces of information which have been already stored in an external device and may also transmit the processing result of the information processing apparatus 10 to the external device through the communication network 41.

The control unit 21 controls the whole components included in the information processing apparatus 10. For example, the control unit 21 performs control operations related to the software start-up on the basis of an instruction from the input unit 11 by the user. Here, the control operations includes, for example, execution control such as the above-described audio recognition by the processing unit 14, keyword determination by the keyword determination unit 15, recommendation list generation by the recommendation list generation unit 16, and recommendation determination by the recommendation determination unit 17. In addition, the control operations includes, for example, execution control such as the above-described software start-up or guiding to a certain operation by the software start-up unit 18 and screen generation by the screen generation unit 19. In addition, the control unit 21 performs control of obtaining (downloading) user information, software information, and the software, from the user registration server 42 and the download server 43 that are coupled to the transmission/reception unit 20 through the communication network 41. The control operation may be performed on the basis of generation of a certain event caused by execution of a program and an instruction by the user, and may be periodically performed at certain time intervals.

Here, as the above-described information processing apparatus 10, for example, a PC, a laptop PC, or the like, may be used. However, the embodiment is not limited to these examples, and, for example, the information processing apparatus 10 may be implemented using a handheld terminal such as a smartphone, a mobile phone, or a tablet terminal; game equipment; or a music playback device.

<Information Processing Apparatus 10: Hardware Configuration>

Here, in the above-described information processing apparatus 10, an execution program that causes a computer to execute each function (software start-up program) is generated, and for example, the software start-up processing according to the embodiment may be realized by installing the execution program in a general-purpose PC, or the like. Here, an example of a hardware configuration of the computer is described, in which the software start-up processing according to the embodiment may be realized.

Figure 2:
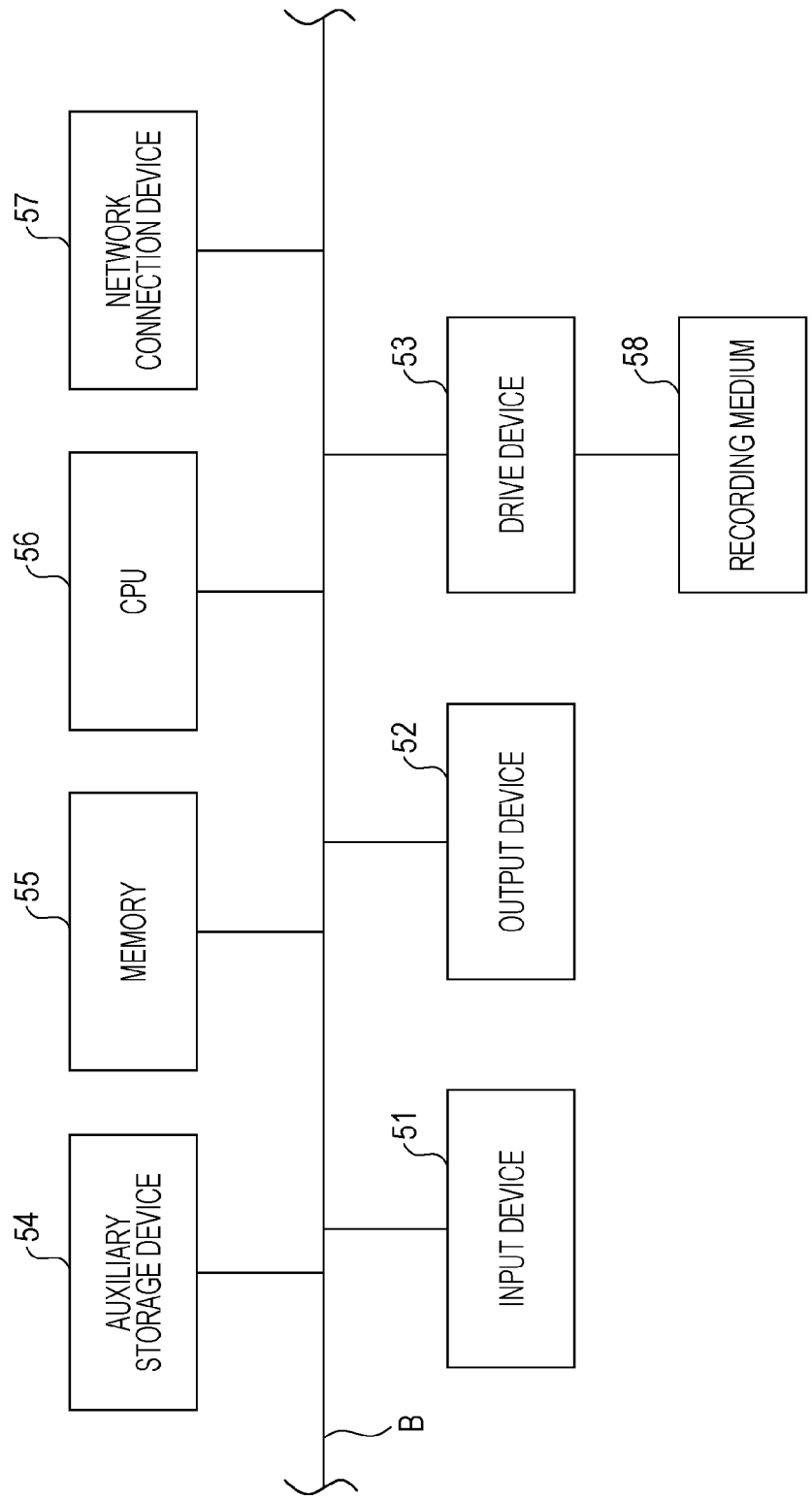
FIG. 2 is a diagram illustrating an example of a hardware configuration, according to an embodiment.

FIG. 2 is a diagram illustrating an example of a hardware configuration, according to an embodiment. FIG. 2 illustrates a hardware configuration in which the software start-up processing according to the embodiment may be realized. A computer in FIG. 2 includes an input device 51, an output device 52, a drive device 53, an auxiliary storage device 54, a memory 55, a central processing unit (CPU) 56 that executes various control operations, and a network connection device 57, and these hardware elements are connected to each other through a system bus B.

The input device 51 includes a pointing device such as a keyboard and a mouse that are operated by the user, and an audio input device such as a microphone. The input device 51 inputs an execution instruction of a program from the user, various pieces of operation information, and information that is used to start up software.

The output device 52 includes a display that displays various windows, data, and the like, which are desired to operate the computer and used to execute the processing in the embodiment. The execution progress of the program and the processing result of the program may be displayed via the output device 52 by a control program provided for the CPU 56. In addition, the output device 52 may print the above-described processing result, and the like, on a print medium such as a paper sheet to present the result to the user.

Here, the execution program that is installed in the computer in the embodiment is provided, for example, using a portable recording medium 58, such as a universal serial bus (USB) memory, a compact disc-read-only memory (CD-ROM), or a digital versatile disk (DVD). The recording medium 58 to which the program is recorded may be mounted on the drive device 53, and the execution program included in the recording medium 58 is installed into the auxiliary storage device 54 through the drive device 53, based on the control signal from the CPU 56.

The auxiliary storage device 54 is a storage unit such as a hard disk and accumulates the execution program in the embodiment, a control program that is stored in the computer, and the like, based on the control signal from the CPU 56 so as to input and output the programs as appropriate. The auxiliary storage device 54 corresponds to, for example, the above-described storage unit 13, and stores the above-described keyword DB 31, the user information DB 32, the registry information 33, the software DB 34, the recommendation rule list 35, the recommendation list DB 36, and the like. The auxiliary storage device 54 may read and write desired information from and to the stored information on the basis of the control signal from the CPU 56.

The memory 55 stores the execution program, and the like, which are read from the auxiliary storage device 54 by the CPU 56. The memory 55 is implemented, for example, using a ROM or a random access memory (RAM).

The CPU 56 may realize processing such as various calculations and input and output of data to and from each of the hardware configuration units by controlling the whole processing of the computer, on the basis of a control program such as an operating system, and the execution program that is stored in the memory 55. Various pieces of information which are required during the execution of the program may be obtained from the auxiliary storage device 54, and the execution result may be also stored in the auxiliary storage device 54.

For example, the CPU 56 performs processing corresponding to a program, on the memory 55, by executing the software start-up program installed in the auxiliary storage device 54 on the basis of an execution instruction, obtained from the input device 51, of the program. For example, as described above, the CPU 56 performs the above-described processing such as the audio recognition by the audio processing unit 14 and the keyword determination by the keyword determination unit 15, by executing the above-described software start-up program. In addition, by executing the software start-up program as described above, the CPU 56 performs processing such as the recommendation list generation by the recommendation list generation unit 16 and the recommendation determination by the recommendation determination unit 17. In addition, by executing the software start-up program as described above, the CPU 56 performs processing, such as the software start-up or the guiding to the certain operation by the software start-up unit 18, and the screen generation by the screen generation unit 19. The processing contents in the CPU 56 are not limited to these examples. The result of the processing executed by the CPU 56 may be stored in the auxiliary storage device 54 as appropriate.

The network connection device 57 obtains an execution program, software, user information, and the like, from an external device connected to the communication network 41, on the basis of the control signal from the CPU 56, by connecting with the communication network 41. The external device corresponds to, for example, the above-described user registration server 42 or the download server 43. However, the embodiment is not limited to those examples. In addition, the network connection device 57 may provide the external device with an execution result that is obtained by executing the program or the execution program itself in the embodiment.

With the hardware configuration as described above, the software start-up processing according to the embodiment may be executed. In addition, by installing a program, the software start-up processing according to the embodiment may be easily realized using a general purpose PC, or the like.

Database Example

Examples of various databases that are used in the above-described embodiment are described with reference to the drawings. FIGS. 3A to 3E are diagrams illustrating various databases. FIG. 3A illustrates an example of the keyword DB 31, FIGS. 3B and 3C illustrate examples of the user information DB 32, FIG. 3D illustrates an example of the software DB 34, and FIG. 3E illustrates an example of the recommendation list DB 36.

In FIG. 3A, an example of a DB for an audio keyword is illustrated. In the example of the keyword DB 31 illustrated in FIG. 3A, as the items, for example, "audio ID", "display name", "pronunciation", and "keyword" are included. However, the items are not limited to the examples. Item "Audio ID" is, for example, a specific value that is used to uniquely identify a registration word. Item "Display name" is, for example, a word (character string) that is used when the registration word is desired to be displayed on a screen. Item "Pronunciation" is, for example, a character string that is used to check matching with characters (word) that are included in audio information obtained by audio recognition in the audio processing unit 14.

The above-described keyword determination unit 15 determines whether or not a word included in audio information (input information) is matched with a word included in item "pronunciation". That is, in the example of FIG. 3A, the above-described "registration word" corresponds to information in item "display name" and information in item "pronunciation". Here, in the determination, for example, the keyword determination unit 15 may determine whether or not a word included in the audio information is similar to a word included in item "pronunciation". In addition, in item "pronunciation", a plurality of character strings may be set. For example, for a display name of "Fudemame®" as illustrated in FIG. 3A, confusable pronunciations such as "Hitsumame" may be added to the item "pronunciation" in addition to pronunciation "Fudemame". For example, for a display name of "Outlook®", pronunciation "Autorukku" only may be included as illustrated in FIG. 3A. Further, confusable pronunciations that vary depending on a person, such as "Autoruku" and "Autoruuku", may be added. Errors in pronunciation may be converted into a single pronunciation (registration word), for example, by term unification processing that is set beforehand. The term unification processing is executed, for example, by the above-described keyword determination unit 15.

In item "keyword" illustrated in FIG. 3A, for example, information is stored that is output to the recommendation determination unit 17 when there is a corresponding "pronunciation" that is matched with (similar to) a word included in the audio information. In the example of FIG. 3A, the keyword DB 31 for the audio information is illustrated. However, the embodiment is not limited to this, and for example, the keyword DB 31 for character information may be generated similar to the keyword DB 31 for the audio information. In this case, for example, information stored as item "display name" illustrated in FIG. 3A is treated as the "registration word".

In the example of the user information DB 32 illustrated in FIG. 3B, as the items, "user ID", "user level", and "setting date (final update date)" are included. However, the items is not limited to this. "User ID" is an ID that is assigned when the user performs user registration to the user registration server 42, and that is a specific value uniquely identifying the user. When the user registration is performed, personal information is registered to the user registration server 42, and, at the same time, the relevant information is also stored, for example, in a basic input/output system (BIOS) in the PC (the information processing apparatus 10) of the user.

In item "user level", a technology level for software corresponding to a PC operation or a certain field is set. For example, a level 1 is set when it is determined that the PC operation is an entry-level, a level 2 is set when it is determined that the PC operation is an intermediate level, and a level 3 is set when it is determined that the PC operation is an advanced level. However, the embodiment is not limited to this. A value of the user level may be obtained, for example, from the user registration server 42 using a user ID as a key, at the time of start-up of the PC. Here, the classification of the user level is registered to the user registration server 42, for example, when the user reports the level by himself/herself at the time of user registration or when a support representative determines the level of a user at the time of the user receiving some support by contacting a support center to register the determined level in the user registration server 42. In addition, when the user level is not set, the initial value "level 1" may be set, and processing of inquiring the level to the user may be executed.

In item "setting date (final update date)" illustrated in FIG. 3B, a date at which a user level is set by the user registration server 42 or a date at which the user level is changed lastly. For example, after the user starts to use software with the entry level "level 1," the level is changed to the intermediate level "level 2" when the used time or the number of times of use of the certain software exceeds a certain amount, or when a function having a high degree of difficulty, which is set beforehand, is used. In addition, as another example, there is a case in which, when the user contacts the support center, the support representative deals with the contact, determines the user level, and modifies the user level. However, the embodiment is not limited to the above mentioned examples.

Here, the above-described user information DB 32 is not limited, for example, to the data example as illustrated in FIG. 3B. For example, as illustrated in FIG. 3C, the user level may be set for each field (category) of software. In this case, as the items, "keyword", "level", and "setting date (final update date)" may be included. However, the items are not limited to such examples, and, as illustrated in FIG. 3B, the user ID that identifies the user may be included as the item.

In the example of FIG. 3C, for three fields such as "postcard creation", "mailer", and "address book" that are set as a keyword, a user level and a setting date (final update date) of the user level are stored. In addition, in the user information DB 32 illustrated in FIGS. 3B and 3C, information that is used to identify the user (for example, a user ID, a password, and the like) and personal information, such as an age, a sex, an address, and a mail address, of the user may be included. In addition, in the user information DB 32, information that is related to software that the user wants to use (demands) may be included.

In the example of the software DB 34 illustrated in FIG. 3D, as the items, "software ID", "display name", "version", "keyword", "target level", "evaluation", "number of times of downloading", "state", "storage destination (link)", "number of times of use", "used time (total)", and "final usage date" are included. However, the items are not limited to this.

Item "Software ID" is an ID of target software and a specific value that is used to uniquely identify the software. Item "Display name" is a character string that is used when the software is desired to be displayed on the screen. Item "Version" is a version number that is used to identify the version of the software. Item "Keyword" indicates a field for which the software is intended. Item "Target level" indicates a user level that is suitable to use the software. As the item "target level", a plurality of target user levels may be registered. For example, when the entry level (level 1) and the intermediate level (level 2) are targets, "1" and "2" are registered. In addition, for example, in the case of the installed or pre-installed software, item "target level" may be registered beforehand at the time of shipment.

Item "evaluation" illustrated in FIG. 3D indicates the usability of the software. Item "evaluation" may be set in a step-by-step manner. For example, "5" is set for the highest evaluation and "1" is set for the lowest evaluation. However, the evaluation is not limited to this. For example, in the case of the download server 43, as the item "evaluation", information that is indicated by an evaluation numeric value, the number of stars, or the like, of software that is displayed on a website may be generally used. For example, in the case of the installed or pre-installed software, the item "evaluation" may be registered beforehand at the time of shipment.

Item "number of times of downloading" illustrated in FIG. 3D indicates, for example, the number of times of downloading by plurality of the users from a site such as the download server 43. For example, in the case of the installed or pre-installed software, a blank may be set to the item "number of times of downloading". However, the embodiment is not limited to this.

Item "state" illustrated in FIG. 3D indicates a state for each piece of software in the PC (information processing apparatus 10). For example, in the case in which target software has been already installed, value "installed" is set. The value "installed" indicates states including a case where software is installed at the time of purchase (pre-installed) and a case where software is installed by the user. In addition, for a state in which software is bundled in the hard disk (storage unit 13) at the time of purchase and is not installed yet, value "bundled" is set. Further, for a state in which target software has been already downloaded from the download server 43 but not installed yet, value "downloaded" is set, and for a state in which target software is not downloaded yet, value "undownloaded" is set so as to distinguish the states of the software. Software in the state of "undownloaded" is, for example, popular software the number of times of downloading of which is large in the download server 43 or the most recent software. However, the embodiment is not limited to the above examples. In addition, the contents that are stored in the above-described item "state" are not limited to the above examples.

In addition, the value of item "storage destination (link)" illustrated in FIG. 3D are different depending on the value of item "state". For example, when item "state" indicates the value "installed", the software has been pre-installed at the time of purchase, or the software has been already installed by the user. Thus, in item "storage destination (link)", a storage destination of an execution file or an execution file name is stored. In addition, when the value of item "state" is "bundled", the software has been bundled in the hard disk at the time of purchase and not installed yet. Thus, in item "storage destination (link)", for example, a storage destination or an installation file name of the bundled file is set. In addition, when the value of item "state" is "downloaded", the software has been downloaded but not installed yet. Thus, in item "storage destination (link)", a storage destination or an installation file name of the downloaded file is set. In addition, when the value of item "state" is "undownloaded", the software is not downloaded yet. Thus, in item "storage destination (link)", a uniform resource locator (URL) of a download website, or the like, is set. By setting the URL as described above, a certain operation may be caused to be guided so that the user accesses a website that is the address destination and downloads the target software. The above-described example is one of examples, and the embodiment is not limited to the above example.

Item "number of times of use" illustrated in FIG. 3D indicates the number of times of use for each piece of software that the user uses in the information processing apparatus 10. In addition, item "used time (total)" illustrated in FIG. 3D indicates a total used time for each of the pieces of software that the user uses in the information processing apparatus 10. In addition, item "final usage date" illustrated in FIG. 3D indicates a final usage date for each of the pieces of software that the user uses.

In the example of the recommendation list DB 36 illustrated in FIG. 3E, as the items, item "keyword" and item "priority" are included. However, the items are not limited to these examples. In the example of FIG. 3E, software name is stored, in order of priority, for each of the keywords "postcard creation", "browser", and "mailer". In the embodiment, as described above, priority of software is assigned for each of the keywords, and the contents (software names) are stored in association with priorities, respectively.

In the assignment of priority, for example, a level of the user is obtained, and corresponding software is set as a target on the basis of a recommendation rule selected from the recommendation rule list 35. In addition, in the embodiment, for example, priority may vary depending on a method of staring up software. For example, when the software is directly started up, software having the first priority is started up immediately. In this case, for example, only software whose value of item "state" in the software DB 34 illustrated in FIG. 3D is "installed" is set as a target. In addition, for example, when the software is selectively started up, candidates of the certain number of pieces of software are displayed in order of decreasing precedence, and the software that the user has selected from the candidates is started up. Thus, in this case, software whose value of item "state" is not "installed" may be also set as a target. For example, software whose value of item "state" in the software DB 34 illustrated in FIG. 3D is "installed", "bundled", "downloaded", or "undownloaded" is included. However, the embodiment is not limited to these examples.

When setting priority for the above-described item "state", for example, priority is set in decreasing order of numeric value determined based on a condition set beforehand (for example, in decreasing order of frequency). For example, priority may be set by assigning weights (assigning a priority level) in the order of item "evaluation" to item "state" to item "number of times of use" to item "number of times of downloading" that are included in the items of the software DB 34 illustrated in FIG. 3D. However, the embodiment is not limited to the above examples. As for item "state", for example, weights may be assigned in the order of value "installed" to value "bundled" to value "downloaded" to value "undownloaded". In addition, for item "number of times of use", for example, weights may be assigned in the order of "recently used software" to "the number of times of use" in comparison with "final usage date". The setting of priority illustrated in FIG. 3E is performed by the above-described recommendation list generation unit 16, or the like.

The database is not limited to the above examples. For example, information such as registration information of software that the user wants to use, a contact record to the support center, an online purchase record, and information on frequently used software and selling software may be stored. In addition, the above-described information is updated, for example, depending on timing at which power of the information processing apparatus 10 is turned on, timing of screen return, timing of a certain time period, or the like.

<Specific Example of the Registry Information 33>

An example of the registry information 33 is described below. In the embodiment, it may be determined whether or not software has been installed, on the basis of whether or not a registry key exists in a registry. As an example of the registry key, for example, there are "HKEY_LOCAL_MACHINE\SOFTWARE\Fujitsu\sa", and the like. However, the embodiment is not limited to this example. In the embodiment, after installed software is obtained by the above-described method, the software information may be stored in the storage unit 13.

<Specific Example of the Recommendation Rule List 35>

An example of the recommendation rule list 35 is described below. In the embodiment, a plurality of recommendation rules are set, and a recommendation list is generated by the recommendation list generation unit 16 on the basis of the recommendation rules. As the recommendation rule, for example, there is set a rule, such as a rule indicating setting of priority for each of the keywords, a rule used to obtain a user level, and a rule indicating assignment of weights to each piece of software. In the embodiment, the above-described rules are managed as a list, and a recommendation list is generated on the basis of one of the rules or a complex rule that is obtained by combining the plurality of rules. In the embodiment, the recommendation rule may be arbitrarily set, and for example, when generation of a recommendation list for a newly added recommendation rule is not processed yet, processing for the unprocessed portion may be executed.

<Example of the Software Start-Up Processing According to the Embodiment>

Figure 4:
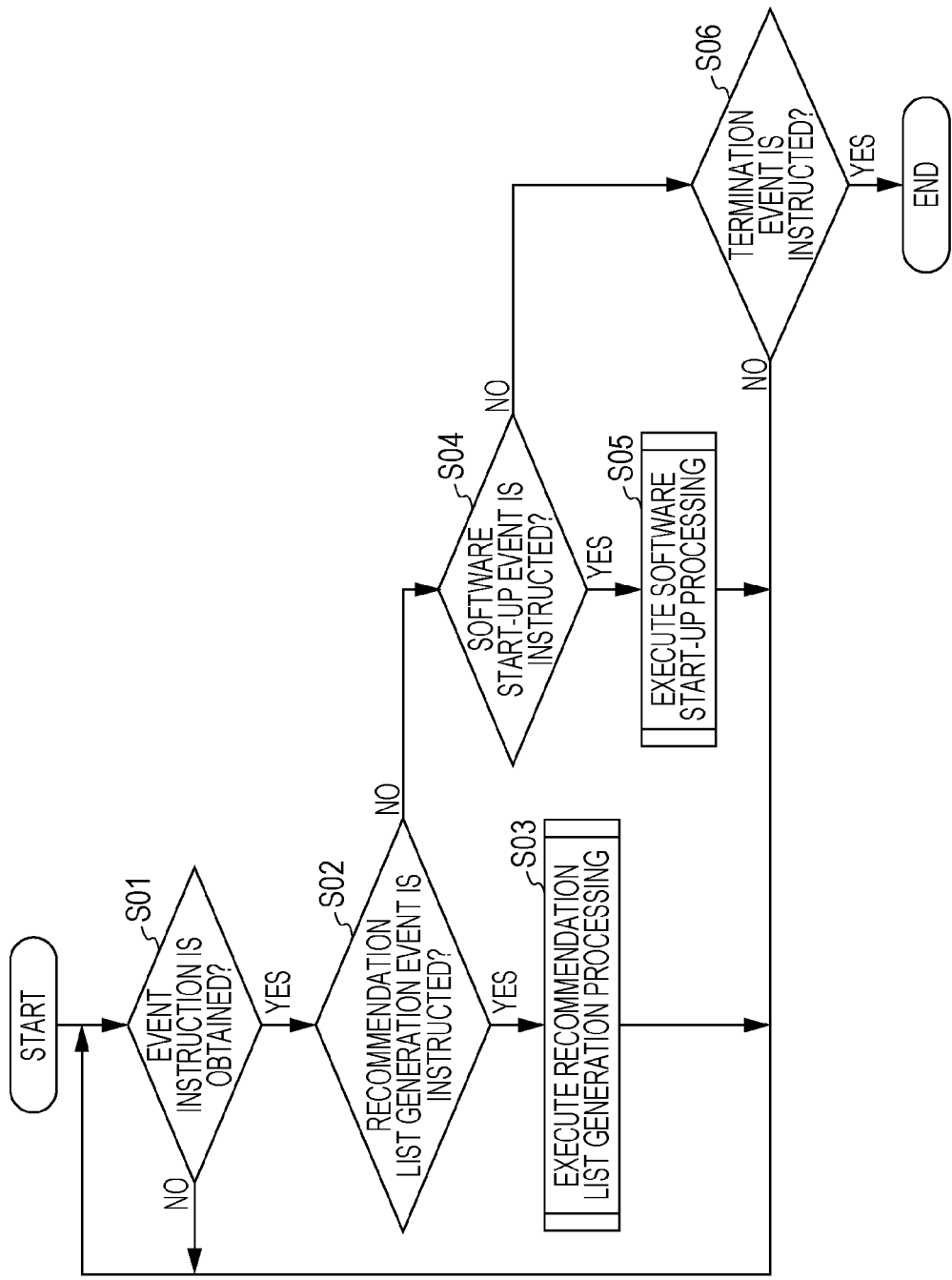
FIG. 4 is a diagram illustrating an example of an operational flowchart for software start-up processing, according to an embodiment.

An example of the software start-up processing according to the embodiment using the above-described information processing apparatus 10 is described in detail below. FIG. 4 is a diagram illustrating an example of an operational flowchart for software start-up processing, according to an embodiment. In the example of the software start-up processing illustrated in FIG. 4, when the information processing apparatus 10 is started up, an event handler is made resident. The event handler is included in various operating systems, and performs various types of processing in response to an event notification that is issued on a regular basis or on an irregular base.

In the software start-up processing, first, it is determined whether or not an event instruction is obtained (S01). The obtaining of the event instruction includes, for example, a case where an instruction from the user is input by the input unit 11 and a case where audio processing is executed by the audio processing unit 14. However, the embodiment is not limited to these examples.

In the software start-up processing, when the event instruction is not obtained (NO in S01), the flow returns to S01 and is in a standby (resident) state until an event is input. Meanwhile, when the event instruction is obtained (YES in S01), it is determined whether or not a recommendation list generation event is instructed by the obtained event (S02). In the embodiment, with respect to the recommendation list generation event, for example, the event may be periodically issued at certain time intervals, the event may be issued once at the time of start-up, or the event may be issued once when the date is changed. In addition, in the embodiment, the recommendation list generation event may be issued when predetermined software is started up in the information processing apparatus 10. The issuance timing may be set arbitrarily.

When the recommendation list generation event is instructed (YES in S02), recommendation list generation processing is executed (S03).

Meanwhile, when the recommendation list generation event is not instructed (NO in S02), it is determined whether or not a software start-up event is instructed by the event obtained in S01 (S04). When the software start-up event is instructed (YES in S04), the software start-up processing is executed (S05). When the software start-up event is not instructed (NO in S04), it is determined whether or not a termination event is instructed by the event obtained in S01 (S06). When the termination event is instructed (YES in S06), the flow ends.

In addition, the flow returns to S01 after the recommendation list generation processing in S03 ends, after the software start-up processing in S05 ends, or when the termination event is not instructed in S06 (No in S06).

In the embodiment, the software start-up event may be issued in tandem with the termination of the above-described recommendation list generation processing. It is also possible to terminate the operating system when the above-described termination event is notified.

<Example of the Recommendation List Generation Processing>

Figure 5:
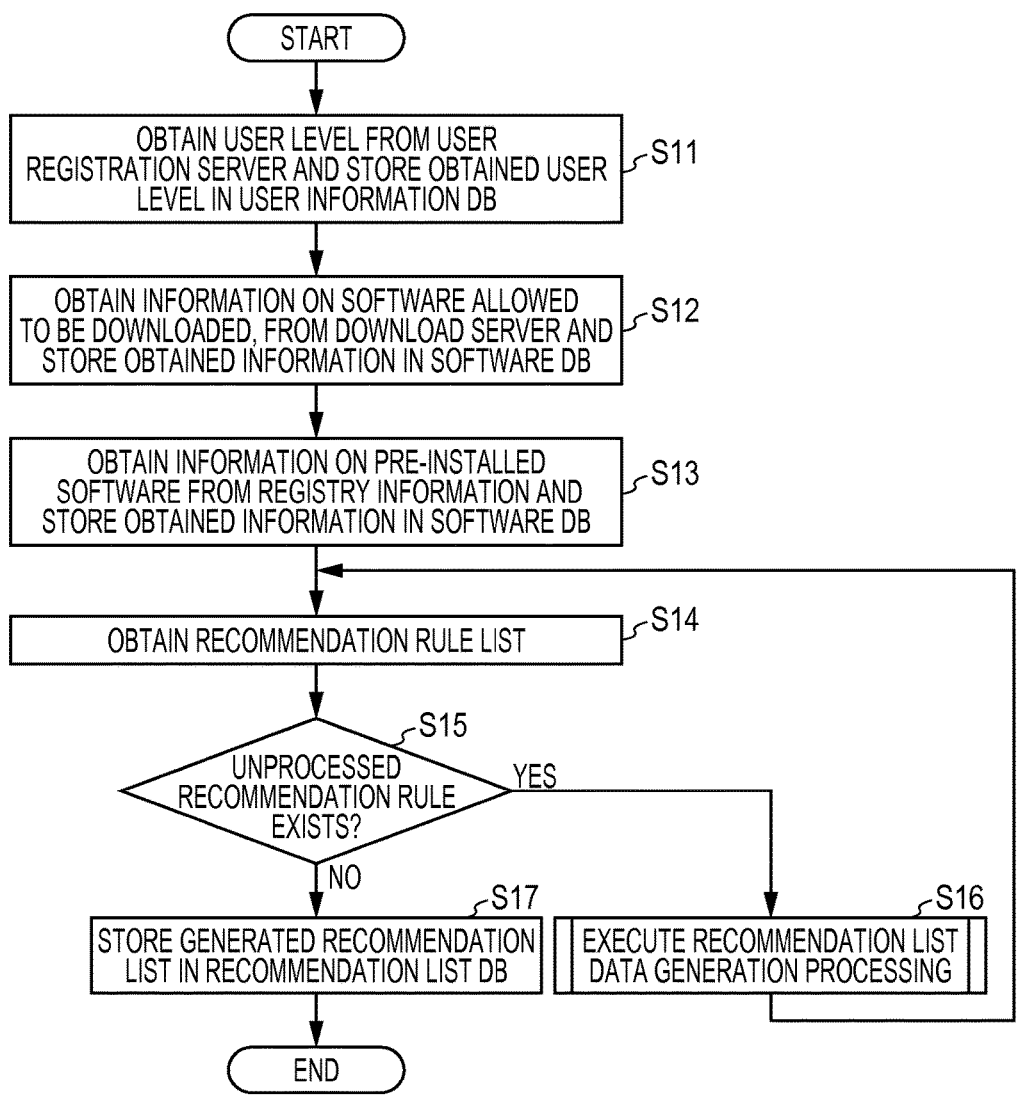
FIG. 5 is a diagram illustrating an example of an operational flowchart for recommendation list generation processing, according to an embodiment.

An example of the above-described recommendation list generation processing is described with reference to FIG. 5. FIG. 5 is a diagram illustrating an example of an operational flowchart for recommendation list generation processing, according to an embodiment. In FIG. 5, for example, the recommendation list generation processing accesses the above-described user registration server 42 through the communication network 41, and obtains a user level from the user registration server 42, to store the obtained user level in the user information DB 32 (S11).

After that, the recommendation list generation processing accesses the above-described download server 43 through the communication network 41, and obtains information on software allowed to be downloaded, from the download server 43, to store the obtained information in the software DB 34 (S12). After that, the recommendation list generation processing obtains, for example, information on pre-installed software with reference to the above-described registry information 33, to store the obtained information in the software DB 34 (S13). In the processing of S13, information on installed software may be obtained. Next, the recommendation list generation processing obtains the recommendation rule list 35 (S14), and it is determined whether or not an unprocessed recommendation rule exists (S15). When the unprocessed recommendation rule exists (YES in S15), the recommendation list data generation processing is executed (S16), and the flow returns to S14 after the recommendation list data generation processing is completed.

Meanwhile, when the unprocessed recommendation rule does not exist, (NO in S15), the generated recommendation list is stored in the recommendation list DB 36 (S17), and the flow ends.

<Example of the Recommendation List Data Generation Processing>

Figure 6:
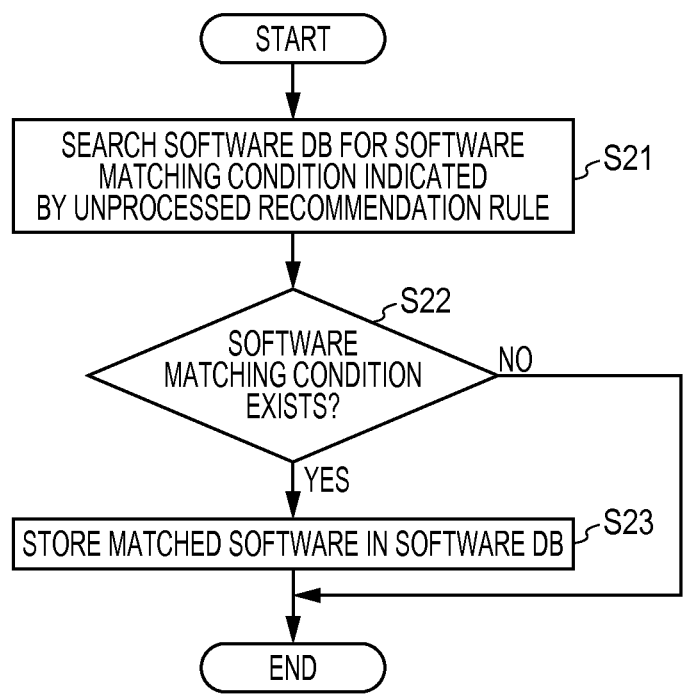
FIG. 6 is a diagram illustrating an example of an operational flowchart for recommendation list data generation processing, according to an embodiment.

An example of the above-described recommendation list data generation processing is described below with reference to FIG. 6. FIG. 6 is a diagram illustrating an example of an operational flowchart for recommendation list data generation processing, according to an embodiment. In the example of FIG. 6, the recommendation list data generation processing searches the software DB 34 for software that matches a condition indicated by the above-described unprocessed recommendation rule (S21).

Then, it is determined whether or not the software matching the condition exists (S22), and when the software matching the condition exists (YES in S22), the matched software is stored in the software DB 34 (S23). Meanwhile, when the software matching the condition does not exist (NO in S22), the flow ends.

<Example of the Software Start-Up Processing>

Figure 7:
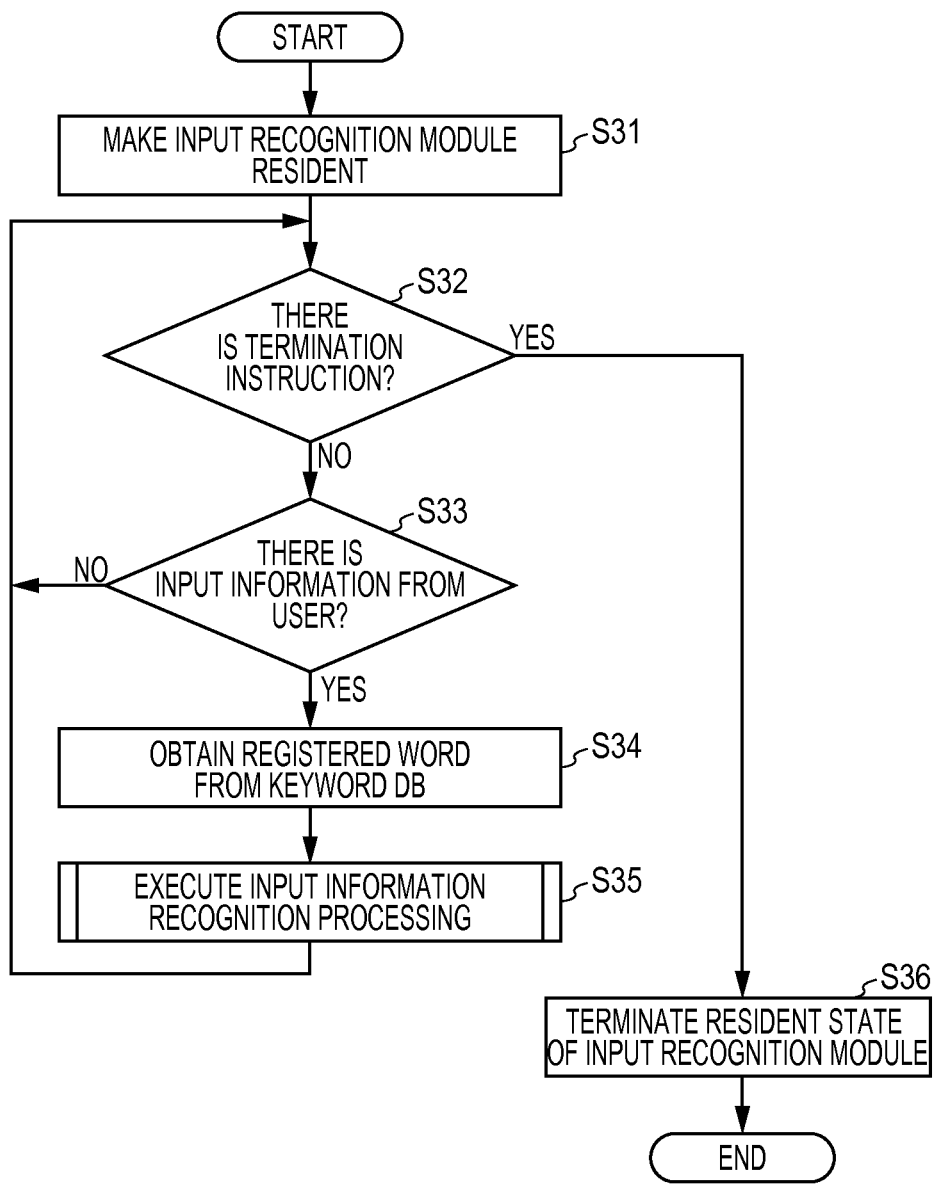
FIG. 7 is a diagram illustrating an example of an operational flowchart for software start-up processing, according to an embodiment.

An example of the above-described software start-up processing is described with reference to FIG. 7. FIG. 7 is a diagram illustrating an example of an operational flowchart for software start-up processing, according to an embodiment. In the example of FIG. 7, first, the software start-up processing makes an input recognition module resident (S31). For example, the input recognition module may be configured to perform audio recognition or perform character analysis. When the input recognition module performs the audio recognition, in S31, for example, the input recognition module is set and prepared so that the audio is received from the input unit 11 such as the microphone, and the audio may be successively analyzed in the audio processing unit 14. In addition, in the case of the character analysis, in S31, for example, the input recognition module is prepared so that characters input from the input unit 11 such as the keyboard are successively analyzed.

After that, it is determined whether or not there is a termination instruction by the user or a termination instruction from the system (S32), and when there is no termination instruction (NO in S32), it is determined whether or not there is input information from the user (S33). For example, the input information from the user may be the name of software to be started up or may be the purpose of use. When there is input information from the user (YES in S33), the above-described list of registration words is obtained from the keyword DB 31 (S34), and input information recognition processing is executed (S35). In addition, after the input information recognition processing of S35 ends or when there is no input information from the user (NO in S33), the flow returns to S32.

When the termination instruction exists (YES in S32), the resident state of the input recognition module is ended (S36), and the flow ends.

<Example of the Input Information Recognition Processing in the Input Recognition Module>

Figure 8:
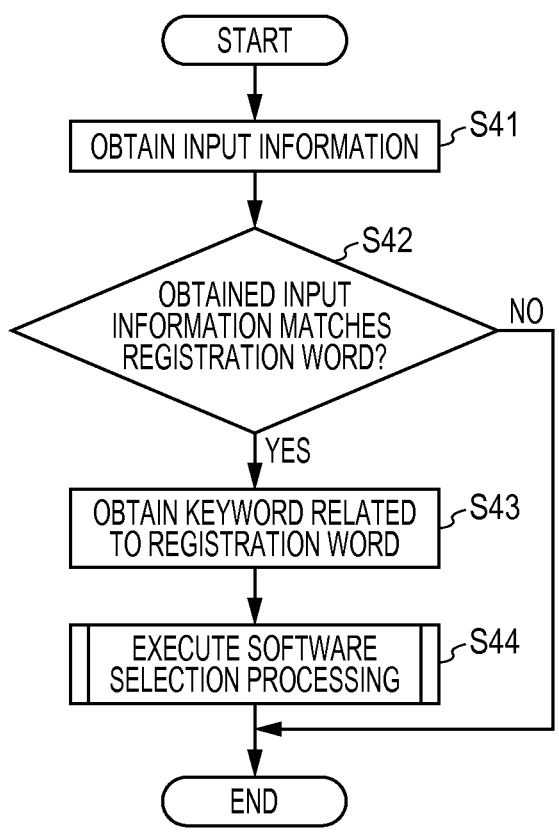
FIG. 8 is a diagram illustrating an example of an operational flowchart for input information recognition processing, according to an embodiment.

An example of the above-described input information recognition processing is described with reference to FIG. 8. FIG. 8 is a diagram illustrating an example of an operational flowchart for input information recognition processing, according to an embodiment. In the example of the input information recognition processing illustrated in FIG. 8, first, input information from the user is obtained (S41). Examples of the input information from the user include information related to software that the user wants to use (demands), and the like. In addition, in S41, for example, when the user emits audio, and the input unit 11 obtains the sound as the input information, an audio recognition module is executed so that a word (character string) included in the audio information is obtained. In addition, in S41, for example, when the input unit 11 obtains characters input by the user, as input information, a character analysis module is executed so that a word (character string) included in the input characters is obtained.

The audio recognition is processing of extracting contents of speech in an acoustic signal, as a word (character data). For example, an acoustic signal is received from the external environment by the microphone, or the like, and the acoustic signal is converted into an audio signal that is an electrical signal, and a speech section that is a section including speech of a person is detected from the audio signal, and character data is extracted by performing, on the speech section, audio verification based on an acoustic model and a vocabulary dictionary. In addition, the character analysis is processing of performing morphological analysis on an input sentence, or the like, and dividing the sentence on which the morphological analysis has been performed, into a unit of a word. In addition, the sentence may be divided into words so that one word has one meaning or a plurality of words have one meaning. The audio recognition and character analysis are not limited to these examples.

After that, it is determined whether or not the obtained input information matches a registration word (S42), and when the input information does not match the registration word (NO in S42), the flow ends. Meanwhile, when the obtained input information matches the registration word (YES in S42), a keyword related to the registration word is obtained from the keyword DB 31 (S43), and software selection processing is executed (S44).

For example, the above mentioned input information recognition processing may be configured to activate, when the input recognition module is made resident, an audio reception handler that is used to receive an event related to audio and a termination event. In this case, the audio reception handler performs standby processing of receiving a message responsive to an event that has occurred. In addition, when a resident state termination event is received, the resident state of the input recognition module is ended. In addition, although the above mentioned input information recognition processing is terminated when the above-described software selection processing ends, the embodiment is not limited to this example. For example, after the termination of the software selection processing, the processing flow may returns to S41 and enter a reception standby state again.

<Example of the Software Selection Processing>

Figure 9:
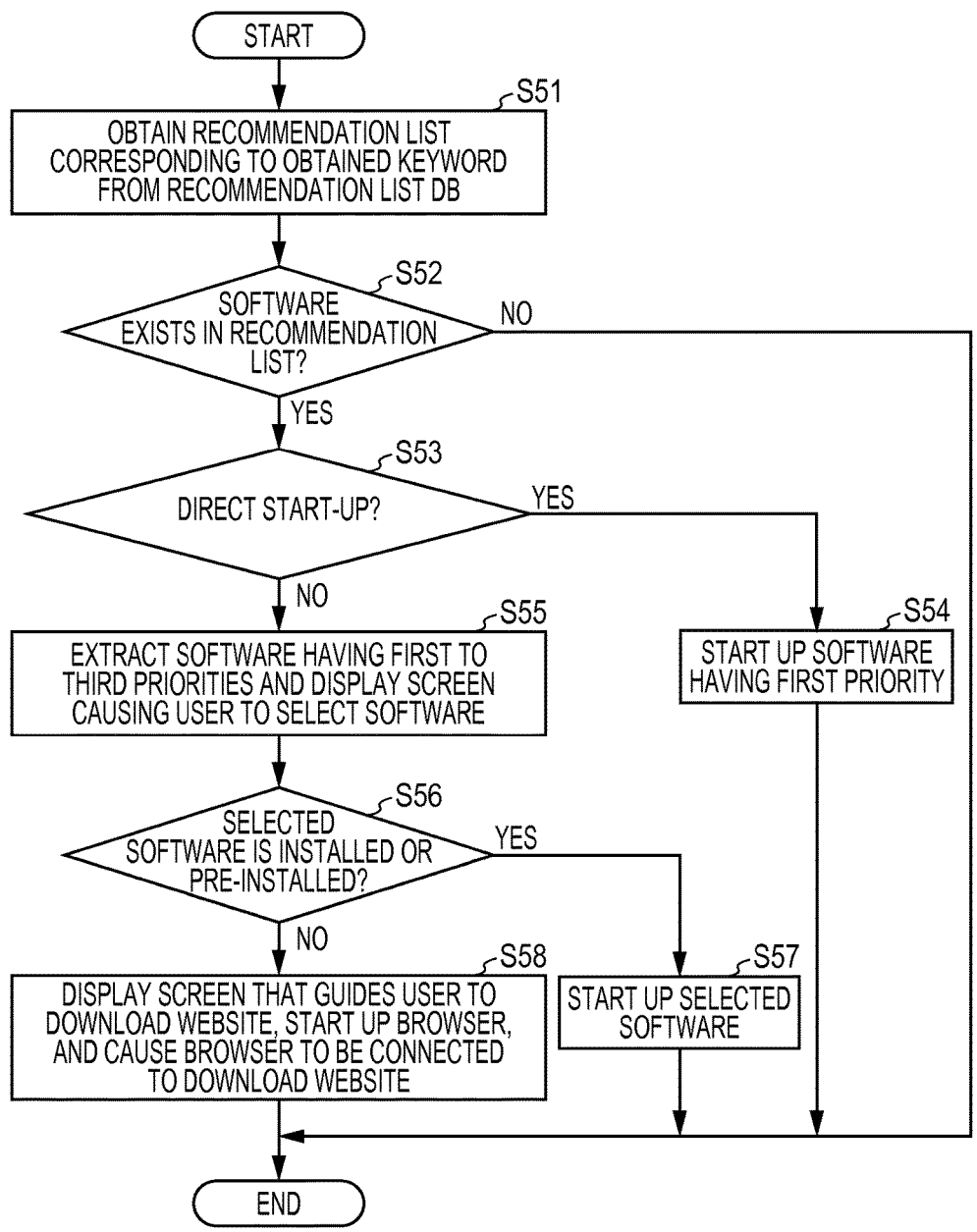
FIG. 9 is a diagram illustrating an example of an operational flowchart for software selection processing, according an embodiment.

An example of the above mentioned software selection processing is described with reference to FIG. 9. FIG. 9 is a diagram illustrating an example of an operational flowchart for software selection processing, according an embodiment. In the description below, it is assumed that there are two types of condition for software start-up: direct start-up and indirect start-up, and the indirect start-up is executed when the condition is not the direct start-up. However, the embodiment is not limited to this example, and another start-up method may be employed.

In FIG. 9, the software selection processing, first, obtains a recommendation list (for example, a plurality of pieces of software information on which prioritization is performed, or the like) corresponding to the obtained keyword from the recommendation list DB 36 (S51).

After that, it is determined whether or not software exists in the recommendation list obtained in the processing of S51 (S52). When there exists at least one piece of software (YES in S52), it is determined whether or not the direct start-up is set as the condition for software start-up (S53).

When the condition for software start-up is the direct start-up (YES in S53), software for which the first priority is set beforehand is started up (S54). In addition, when the condition for software start-up is not the direct start-up (NO in S53), pieces of software having the first to third priorities are extracted, and a screen causing the user to select software is displayed (S55).

After that, the selection information from the user is obtained, and it is determined whether the selected software has been installed or pre-installed (S56). When the selected software has been installed or pre-installed (YES in S56), the selected software is started up (S57). When the selected software is not installed or pre-installed yet (NO in S56), for example, a screen that guides the user to a download website is displayed, and a browser is started up to cause the browser to be connected to the download website (S58). On the screen that guides the user to the download website, a URL of the download website and a message that causes the user to download software, and the like, are displayed.

The above mentioned processing of S58 illustrates a case where the state of the selected software is "undownloaded". However, in S58, the embodiment is not limited to this case, and different processing may be executed depending on the state of the selected software. For example, when the selected software is in the bundle state or the downloaded state, a screen that guides the user to the installation may be displayed, or processing of displaying a folder of a storage destination of a file to be installed may be executed.

<Specific Example in a Case in which the User Level is Changed>

Here, in the embodiment, an example in which the user level is changed is described. For example, the setting of the user level may be changed upwardly depending on "case in which the user sets the user level at the time of user registration", "case in which the user changes the user level at the time of update of user registration information", "case in which the support representative sets and updates the user level when the user receives the support", "case in which a certain function is executed", and the like.

For example, in a case where a macro function included in table calculation software is executed, the level is changed to "3" when the user level is "2" or less. In addition, for example, when the number of times of start-up of certain software exceeds a certain value, the user level (for example, the user level of the corresponding keyword when a level is set for each of the keywords) is raised a notch. In addition, for example, when the used time of certain software exceeds a predetermined time, the user level (for example, the user level of the corresponding keyword when a level is set for each of the keywords) is raised a notch.

For example, operating times of software with respect to the same keyword are combined, and when the total operating time exceeds a predetermined time, the user level (for example, the user level of the corresponding keyword when a level is set for each of the keywords) is raised a notch.

In addition, when software related to a certain keyword (for example, postcard creation) is not used over a certain time period or more since the final usage date, the user level at present for the same keyword may be changed so as to be lowered a notch. As described above, in the embodiment, by increasing or decreasing the user level depending on the usage status at present, or the like, the software start-up may be performed further appropriately.

Screen Example

Figure 10:
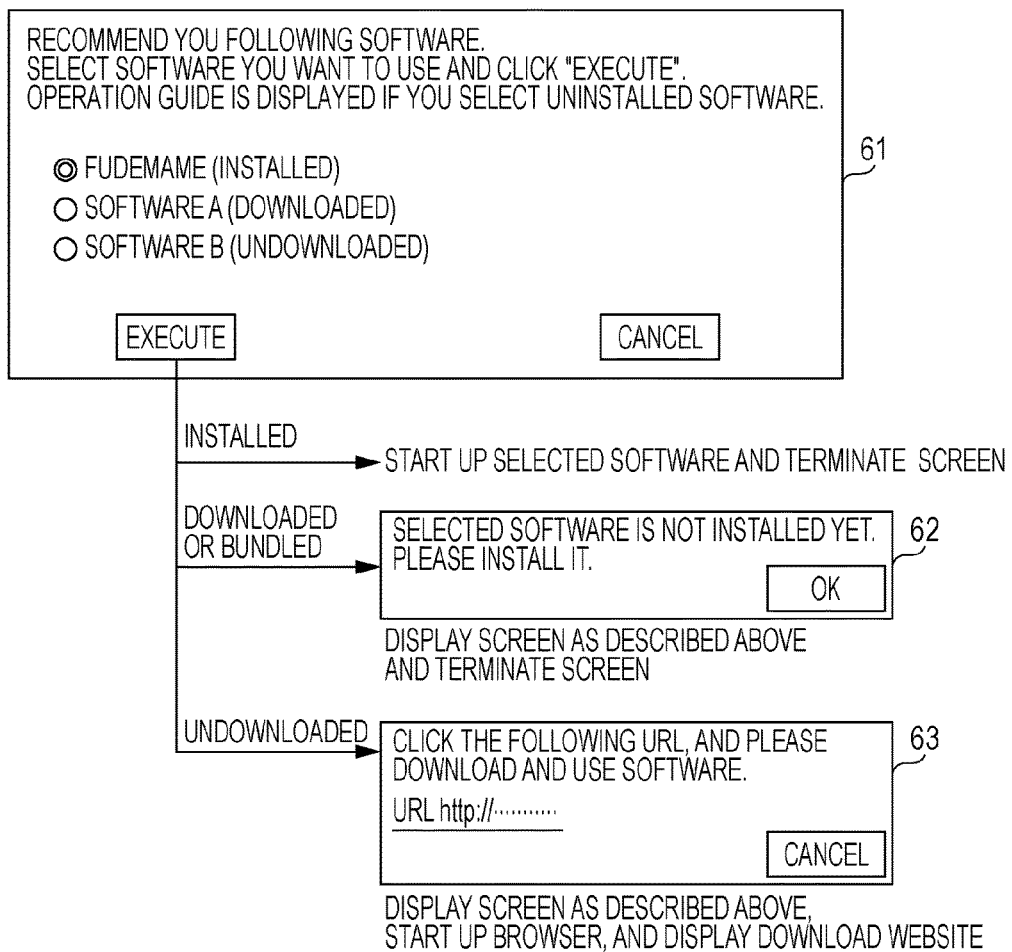
FIG. 10 is a diagram illustrating an example of a screen, according to an embodiment.

An example of a screen that is presented to the user in the embodiment is described below with reference to FIG. 10. FIG. 10 is a diagram illustrating an example of a screen, according to an embodiment. In the example of the screen illustrated in FIG. 10, a screen example at the time of selection start-up is illustrated. At the time of direct start-up, the screen as illustrated in FIG. 10 is not displayed since the selected software is directly started up.

In the example of FIG. 10, as the screen example when the selected software is selectively started up, a plurality of pieces of recommendation software are displayed on a display screen 61, and the display screen 61 includes an area used to select one of the pieces of software. In the example of FIG. 10, three types of software are displayed as software to be displayed on the display screen 61. However, the embodiment is not limited to this example, and at least two types of software suffice for displaying. In addition, in the embodiment, as illustrated in the example of FIG. 10, the state (for example, "installed", "downloaded", "undownloaded", or the like) of the displayed software may be also displayed.

Here, when the user selects one of the pieces of software that are displayed on the display screen 61, and presses an execution button, the state of the selected software is determined. When the state of the selected software is "installed", the selected software is started up and displaying the screen ends. When the state of the selected software is "downloaded" or "bundled", another display screen 62 is displayed, and a message used to guide the user to install the software may be displayed. In this case, in addition to a message "The installation of the selected software has not been completed yet. Please install the software", a message "Do you want to start the installation of the software?" may be displayed on the display screen 62. When "OK" button is pressed in response to the message of "Do you want to start the installation of the software?", the installation of the software is started.

When the state of the software selected in the display screen 61 is "undownloaded", the display screen 63 is displayed in which a message of "Click the following URL, and please download and use the software", or the like, is displayed, and a browser is started up so that processing of displaying a download website, or the like, may be executed. The embodiment is not limited to the above examples.

FIGS. 11A to 11C are diagrams illustrating examples of screen, according to an embodiment. In the example of FIGS. 11A to 11C, screen examples of a recommendation list when a plurality of keywords are recognized are illustrated.

In the example of FIGS. 11A to 11C, examples of an operation when the plurality of keywords are extracted from audio (pronunciation) of the user are illustrated. That is, in the examples of FIG. 11A to 11C, examples are illustrated that indicate change of priority of the recommendation list and display images thereof.

First Example

In a first example, first, a case where a plurality of keywords are sequentially recognized by one piece of pronunciation is described. As a pronunciation example, when "Nengajo mêru wo dashitai" is pronounced as the purpose of use, a keyword of "postcard creation" is recognized from the pronunciation of "Nengajo", and a keyword of "mailer" is recognized from the pronunciation of "mêru".

In such a case, for example, the user may set at least one of start-up methods that are set beforehand. For example, as a first start-up method, the last recognized keyword out of the obtained keywords is set valid. As a result, for the above-described pronunciation example, "mailer" is set valid.

As a second start-up method, for example, corresponding keywords are sequentially presented. The presentation order is, for example, the order in which the matching degrees of the keywords are higher and times at which the keywords are used are later. In the above mentioned pronunciation example, for example, a recommendation list is displayed, as illustrated in a display screen 71 of FIG. 11A. In this case, it is also indicated, on the screen, that there is another keyword candidate, and switching to a recommendation list of another keyword "postcard creation" is performed when a recommendation list of "mailer" is displayed.

When the recommendation list is not displayed, for example, as illustrated in a display screen 72 of FIG. 11B, a message used to confirm the start-up of "mailer" is displayed, and "mailer" is started up when "OK" is selected, and a message used to confirm the start-up of "postcard creation" is displayed when "Next candidate" is selected. That is, in the example of FIG. 11B, in the descending order of priority levels, whether or not the start-up is to be executed is confirmed for the user.

As a third start-up method, for example, options corresponding to the keywords are presented, and the selected option is started up. Here, the options may be arranged in the order in which the matching degree of a keyword is higher and a time at which the keyword are used is later. In the above mentioned pronunciation example, in a display screen 73 as illustrated in FIG. 11C, options are arranged in the order of "mailer" and "postcard creation", and when the user selects any one of the options, the corresponding software is executed. In the display screen 73, the selection and execution of the software may be cancelled by pressing "cancel" button.

Second Example

As a second example, a case where a plurality of keywords are set for pronunciation of one word is described below. For example, when "Renraku wo toritai" is pronounced as a pronunciation example, it is conceivable that the pronunciation of one word of "Renraku" is set with a plurality of keywords such as "address book", "mail", and "postcard creation". In this case, software is started up by the following start-up method.

As a first start-up method, a keyword is set valid that is associated with the software lastly started-up or the software that has been started up further more times, out of pieces of software that are registered to a recommendation list of each of the keywords.

In addition, as a second start-up method, the corresponding keywords may be sequentially presented in the order in which a time at which software associated with the keywords has been started up is later or in the order in which the number of times software associated with the keywords has been started up is greater.

As a third start-up method, options corresponding to a keyword are presented, and the selected option is started up. Here, the options are arranged in the order in which a time at which software associated with the keywords has been started up is later or in the order in which the number of times software associated with the keywords has been started up is greater.

In the embodiment, by displaying any one of the above-described display screens 71 to 73, the user may be notified of the existence of software, and the user may be caused to start up the appropriate software easily. The screen example is not limited to the above mentioned examples, and the layout, and the like, are not limited to the examples.

In the start-up method, in addition to the start-up of software itself, for example, the user may be guided to purchase of recommendation software corresponding to the user level, by starting up the software and displaying a frequently used format and a recommended format. In addition, in the above-described embodiments, software corresponding to the demand and level of the user may be started up. For example, in the embodiments, the user level is obtained, and software corresponding to the obtained user level may be started up. In addition, in the embodiments, appropriate software is started up depending on a raise in the user level. In addition, in the embodiments, in conjunction with a certain download website, software other than pre-installed software is also added as a candidate on the basis of the download history. In addition, in the embodiments, in conjunction with a certain download website, software other than pre-installed or downloaded software may be also added as candidate software.

In addition, in the embodiments, even when the user does not operate the PC, target software may be started up by analyzing a natural language, or the like, which the user speaks. In addition, target software may be started up by inputting the name of software when the name of the software is known and by inputting the purpose of use, or the like, when the name of the software is unknown. In addition, when there are plural pieces of target software, optimal software may be selected on the basis of the user level and the user demand, to start up the optimal software.

The embodiments are described in detail above, however various modifications and changes are also made in addition to the above-described modification, within the scope described in the claims, without being limited to a certain embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for starting up software, the apparatus comprising:

a memory configured to store first information on software and a keyword database that stores a registration word in association with each of keywords, the each keyword indicating a category of software related to the registration word, the registration word being used to recognize a purpose of use of software or a software name from second information input by a user and indicating software that the user wants to use; and a processor coupled to the memory and configured to:

generate, in association with a target level of a user who uses software obtained from a first external device coupled to a communication network, based on the first information and third information that is related to software and obtained from a second external device connected to the communication network, a recommendation list database that stores a recommendation list in association with each of keywords, the recommendation list being a list that indicates pieces of software to be recommended for each keyword in association with priority levels assigned thereto, the target level indicating user level suitable to use the software, the third information including state information indicating whether corresponding pieces of software are installed on the apparatus or are downloadable from the second external device, receive the second information from the user, determine a keyword related to the received second information by comparing the received second information with the registration words stored in the keyword database in the memory, obtain a recommendation list associated with the determined keyword from the recommendation list database associated with the latest level of the user, obtain software to be recommended to the user in accordance with the priority levels assigned to the pieces of software indicated by the obtained recommendation list, and start up the obtained software.

2. The apparatus of claim 1, wherein
the third software information is changed in conjunction with the level of the user that is changed by the first external device.

3. The apparatus of claim 1, wherein
a priority level of software to be recommended to the user is changed when the level of the user is increased.

4. The apparatus of claim 1, wherein
when plural pieces of software to be recommended to the user are obtained, a screen causing the user to select one of the plural pieces of software is generated.

5. The apparatus of claim 4, wherein
installation states of the plurality of pieces of software for the apparatus are displayed.

6. The apparatus according of claim 4, wherein
when one of the plural pieces of software is in an undownloaded state, a screen for guiding the user to use the software is generated.

7. A non-transitory computer readable recording medium having stored therein a program for causing a computer to execute a procedure comprising:

providing first information on software and a keyword database that stores a registration word in association with each of keywords, the each keyword indicating a category of software related to the registration word, the registration word being used to recognize a purpose of use of software or a software name from second information input by a user and indicating software that the user wants to use;

generating, in association with a target level of a user who uses software obtained from a first external device coupled to a communication network, based on the first information and third information that is related to software and obtained from a second external device connected to the communication network, a recommendation list database that stores a recommendation list in association with each of keywords, the recommendation list being a list that indicates pieces of software to be recommended for the each keyword in association with priority levels assigned thereto, the target level indicating user level suitable to use the software, the third information including state information indicating whether corresponding pieces of software are installed on the apparatus or are downloadable from the second external device;

receiving the second information from the user;

determining a keyword related to the received second information by comparing the fourth received second information with the registration words stored in the keyword database;

obtaining a recommendation list associated with the determined keyword from the recommendation list database associated with the latest level of the user;

obtaining software to be recommended to the user in accordance with the priority levels assigned to the pieces of software indicated by the obtained recommendation list; and starting up the obtained software.

8. A method for starting up software, the method comprising:

providing first information on software and a keyword database that stores a registration word in association with each of keywords, the each keyword indicating a category of software related to the registration word, the registration word being used to recognize a purpose of use of software or a software name from second information input by a user and indicating software that the user wants to use;

generating, in association with a target level of a user who uses software obtained from a first external device coupled to a communication network, based on the first information and third information that is related to software and obtained from a second external device connected to the communication network, a recommendation list database that stores a recommendation list in association with each of keywords, the recommendation list being a list that indicates pieces of software to be recommended for the each keyword in association with priority levels assigned thereto, the target level indicating a user level suitable to use the software, the third information including state information indicating whether corresponding pieces of software are installed on the apparatus or are downloadable from the second external device;

receiving the second information from the user;

determining a keyword related to the received second information by comparing the fourth received second information with the registration words stored in the keyword database;

obtaining a recommendation list associated with the determined keyword from the recommendation list database associated with the latest level of the user;

obtaining software to be recommended to the user in accordance with the priority levels assigned to the pieces of software indicated by the obtained recommendation list; and starting up the obtained software.

* * * * *